United States Patent [19]

Bellah et al.

[11] Patent Number: 4,830,156

[45] Date of Patent: May 16, 1989

[54] MECHANICAL TRANSMISSION CLUTCH CONTROL

[75] Inventors: Glen R. Bellah, Bolingbrook; Kevin B. Williams, Woodridge, both of Ill.

[73] Assignee: J. I. Case Company, Racine, Wis.

[21] Appl. No.: 161,182

[22] Filed: Feb. 26, 1988

[51] Int. Cl.⁴ .................. B60K 41/22; G05G 5/06
[52] U.S. Cl. .................................. 192/3.63; 192/3.62; 192/109 F; 74/475
[58] Field of Search ............. 192/3.63, 3.62, 109 F; 74/475

[56] References Cited

U.S. PATENT DOCUMENTS 4,146,120  3/1979  Stevens ........................... 192/3.63
4,297,914  11/1981  Klem et al. ......................... 74/475

Primary Examiner—Rodney H. Bonck
Assistant Examiner—Andrea Pitts
Attorney, Agent, or Firm—Dressler, Goldsmith, Shore, Sutker & Milnamow, Ltd.

[57] ABSTRACT

A manually operable creep control mechanism for a tractor of the like having multiple direct drive gears and a creep clutch. The mechanism comprises an elongated arm pivotally mounted on the control box cover plate adjacent the slot through which the gear shift lever travels to shift into the direct drive gear positions. In a first position, the arm is clear of the slot and the gear shift lever is free to move through the entire range of gear positions, while preventing inadvertent pivoting of the arm out of the first position once the lever is in a predetermined low gear, such a fourth. When pivoted to a second position, the arm lies across the slot and limits shifting of the lever to a predetermined higher gear, such as twelfth, while preventing inadvertent movement of the arm out of the second position once the lever is at or beyond the fourth gear position. A flexible switching cable is connected to the arm and an electrical switch for actuating the creep clutch. When the arm is in the first position, the switch is off and when the arm is in the second position the switch is on.

11 Claims, 2 Drawing Sheets

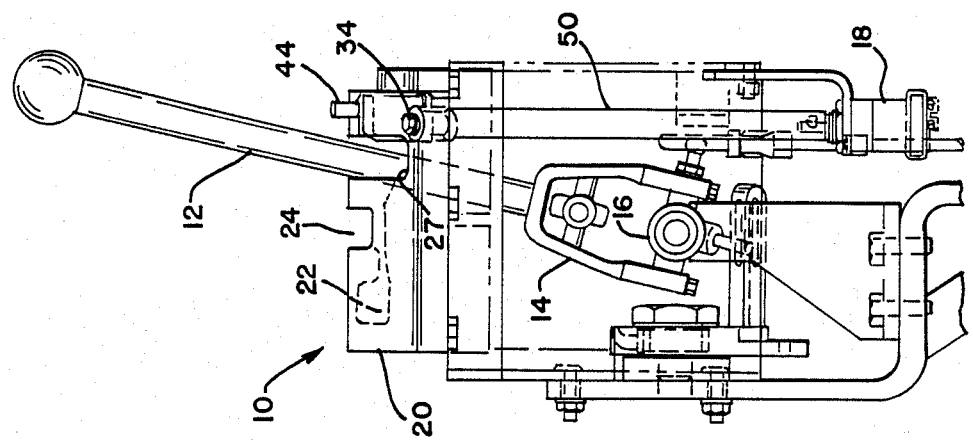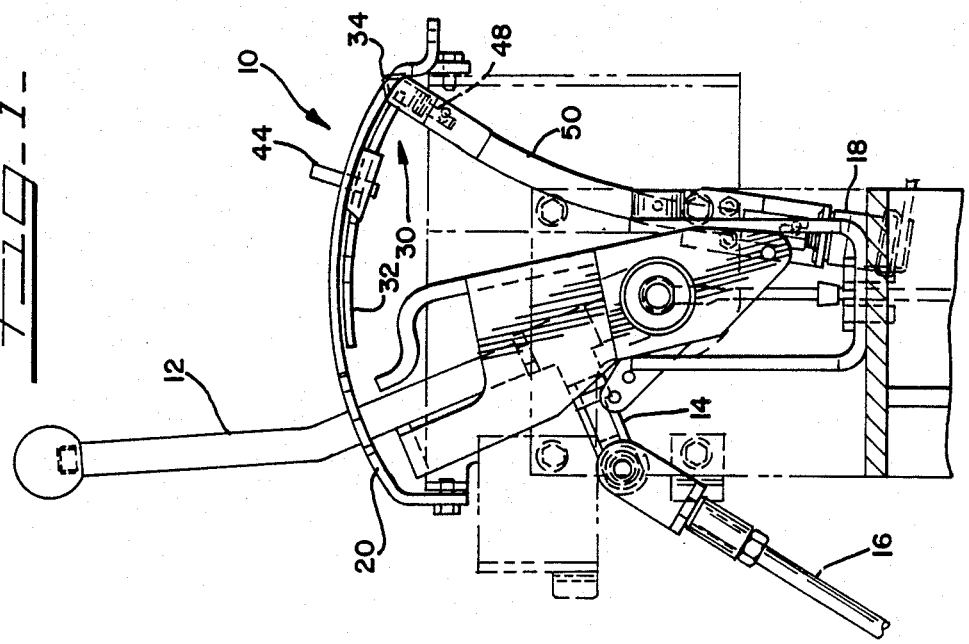

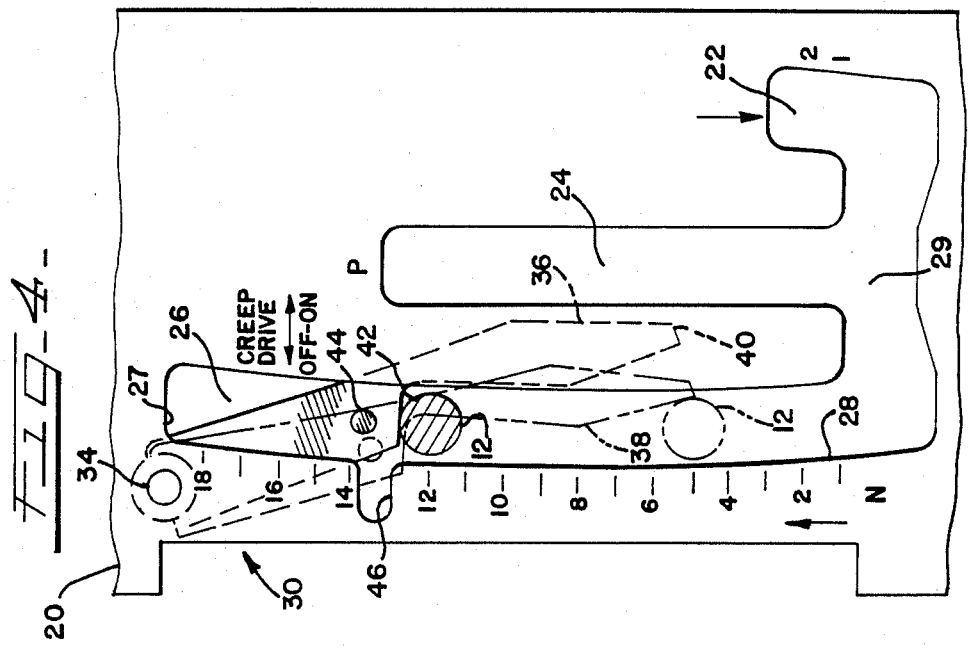
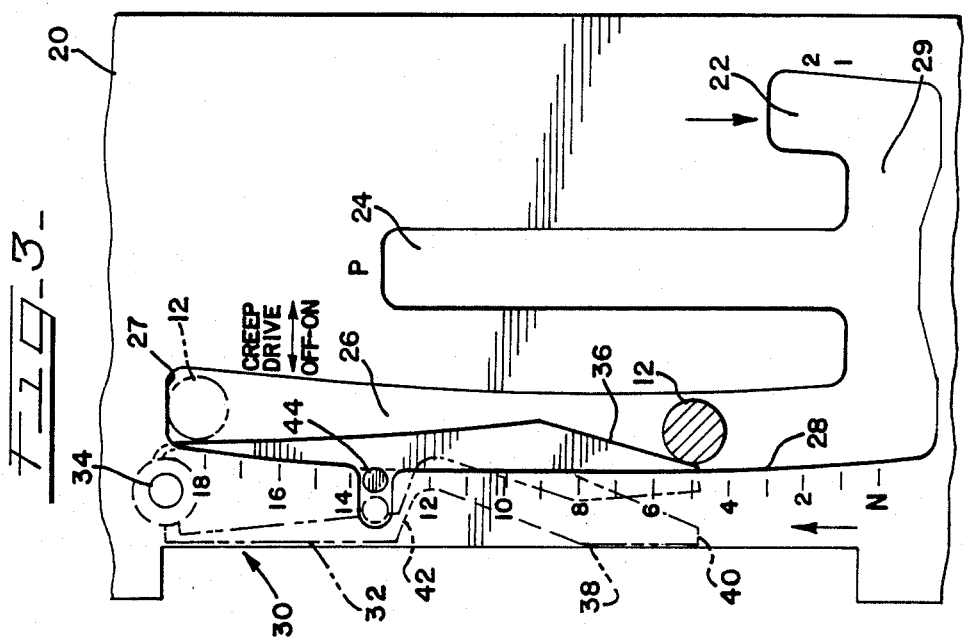

MECHANICAL TRANSMISSION CLUTCH CONTROL

TECHNICAL FIELD

This invention relates to transmission controls for agricultural and earth-working implements, such as tractors and the like, and more particularly to a mechanical transmission control for selectively engaging the creep clutch of such implements.

BACKGROUND OF THE INVENTION

Agricultural and earth-working implements, like tractors, are required to operate under widely varying conditions of load, terrain, soil conditions and speeds. All purpose implements of this type are therefore typically provided with transmissions having many gear ratios or positions, numbering as many as eighteen. In addition, those implements frequently are provided with what is commonly known as a creep clutch.

A creep clutch modifies the normal output of the tractor transmission thereby enabling the tractor to travel at greatly reduced or creeping speeds, but with greater torque. The slower speed and increased torque are desirable and useful under certain operating conditions, such as muddy soil or very heavy towing loads. However, it is necessary for efficient use of the equipment that positive control be exercised over the creep clutch to prevent inadvertent engagement or disengagement under certain conditions. For example, engagement of the creep clutch while the tractor is operating at relatively high speed could result in damage to the tractor transmission or other components of the drive train. Similarly, disengagement of the creep clutch while the tractor is being operated in the upper speed range of the creep mode can result in undesirable lurching of the tractor, again with the potential of damaging the tractor drive train.

There thus exists a need for a creep clutch control that is simple to use and insures against the types of inadvertant engagement or disengagement described.

SUMMARY OF THE INVENTION

The present invention provides a mechanical control for the creep clutch of a tractor or other implement that affords positive control over the clutch and insures against inadvertent engagement or disengagement thereof under certain conditions. The creep clutch control is associated with the conventional gear shift lever and control boxes found on the implements and is simple to operate for insuring the proper operation of the selected use of the clutch.

In a typical tractor or similar implement, the operator's cab is equipped with a transmission control box and gear shift lever. The gear shift lever projects up through a cover plate having a number of slots or notches for accommodating travel of the lever therein. At least one of the cover plate slots is elongated and permits movement of the gear shift lever through all of the implement's forward gear positions, such as, one through eighteen.

The present invention comprises a creep clutch control assembly associated with the elongated cover plate slot and gear shift lever. The assembly comprises a combination switching and lever limiting arm manually pivotable between a first position clear of the elongated slot and a second position blocking a portion of the elongated slot to limit travel of the gear shift lever therein.

The combination arm is also operationally connected to an electrical switch that actuates the power supply for the creep clutch, ordinarily hydraulic. In the first position of the arm, the creep clutch is deactivated and the gear shift lever is free to move through all normal drive gear positions. Pivoting of the control arm is possible while the transmission is in the lowest few gears, but when the shift lever reaches a certain predetermined gear position (e.g., fourth gear) the shape of the arm cooperates with the lever to prevent pivoting of the arm, thus preventing engagement of the creep clutch. When the arm is in the second position, the creep clutch has been activated through operation of the switch and the gear shift lever is shiftable only up to a pre-determined high gear position (e.g., twelfth gear). Between the low and high gear positions (e.g., fourth and twelfth) the arm cooperates with the lever to prevent reverse pivoting of the arm, thus preventing disengagement of the creep clutch unless the shift lever is moved down to the lower gear positions.

The cooperation between the combination arm and gear shift lever gives the operator complete control over the creep clutch and yet is simple to operate. At the same time, the invention may be readily incorporated into existing implements at relatively modest cost.

Numerous other features and advantages of the present invention will become readily apparent from the following detailed description, the accompanying drawings, and the appended claims.

BRIEF DESCRIPTION OF THE DRAWINGS

In the accompanying drawings forming a part of the specification, and in which like numerals are employed to designate like parts throughout, FIG. 1 is a fragmentary vertical elevational view of the interior of a transmission control box showing the creep clutch control invention incorporated therein;

FIG. 2 is a front elevational view of portions of the interior of the transmission control box;

FIG. 3 is an enlarged fragmentary developed view of the control box cover showing the creep control arm in the "off" position; and FIG. 4 is a similar view showing the creep control arm in the "on" position.

DETAILED DESCRIPTION OF THE INVENTION

While the present invention is susceptible of embodiment in various forms, there is shown in the drawings and will hereinafter be described a presently preferred embodiment of the invention, with the understanding that the present disclosure is intended to be an exemplification of the invention, and is not intended to limit the invention to the specific embodiment illustrated.

Referring in greater detail to the Figures of the drawing, the reference numeral 10 indicates generally a transmission control box of the type found at the operator's station of a tractor or the like. Typically, the control box 10 houses a gear shift lever 12 connected to a clevis arrangement 14 and linkage 16 for engaging the various drive gears of the tractor. An electrical switch 18 operates a solenoid for the spool valve which typically provides hydraulic fluid to the associated transmission creep clutch (not shown).

A cover plate 20 closes the top of the control box 10 and the gear shift lever 12 projects through suitable operating slots provided in the plate. As best seen in FIGS. 3 and 4, cover plate 20 comprises a reverse gear slot 22, a parking slot 24, an elongated direct drive gear slot 26 defined by a front edge 27, a lateral edge 28, and a common transverse neutral slot 29. In the embodiment illustrated, the tractor is equipped with a transmission including 18 forward gear speeds and the lateral edge 28 of the slot 26 is thus marked from 1 through 18 to indicate the positioning of the gear shift lever 12 for the different gears.

A transmission creep control assembly 30 embodying the principles of the invention is mounted in the control box 10 and affords selective operator control over the creep clutch. Creep control assembly 30 comprises an elongated limiting and switching arm 32 pivotally connected at 34 to the cover plate 20. The arm 32 is of complementary arcuate configuration with the cover plate 20 (see FIG. 1) and, it will be noted, the pivot connection 34 is forwardly of the highest gear setting, in this instance 18.

The limiting-switch arm 32 comprises a blade-like member having opposed camming edges 36, 38 adjacent the free end 40 of the arm and a medial limiting notch 42. A short handle 44 is secured to the arm 32 and projects upwardly through a notch 46 formed in the lateral edge 28 of the slot 26. The handle 44 is finger-grippable by the operator to pivot the arm 32 about the pivot connection 34 as clearly see in FIGS. 3 and 4. It is important to note that the length of the arm 32 between the pivot 34 and free end 40 is shorter than the full length of the slot 26 so that said free end is located just forwardly of one of the lower gear positions, in this instance number 4.

At its front end, the arm 32 carries a depending stub shaft 48 (FIG. 1). A flexible cable member 50 is connected to the stub shaft 48. Flexible cable member 50 is connected to the stub shaft 48 and the opposite end of said cable member is operatively connected to the electrical switch 18. When the handle 44 is in the notch 46 (as in FIG. 3), the switch 18 is off and the creep clutch inoperative, but counterclockwise rotation of the handle 44 to the position shown in FIG. 4 turns on the switch 18 to actuate the creep clutch.

Operation and the advantages of the creep control assembly 30 should now be readily understandable with reference to FIGS. 3 and 4. When the handle 44 is at the extremity of the notch 46, the slot 26 is completely free of the arm 32 and the lever 12 is freely shiftable to any of the direct drive gear positions. Once the lever 12 reaches gear position 4, however, it is not possible to actuate the creep clutch because of the impeding effect of the lever against the camming edge 36. Accidental or inadvertent actuation of the creep clutch at too high a speed, above 4, is thus prevented. On the other hand, the operator can actuate the creep clutch at the acceptably low speeds below 4.

When the arm 32 is pivoted fully counterclockwise to actuate the creep clutch (FIG. 4), portions of the arm 32 lie across the slot 26 and disconnection of said clutch is prevented by the camming edge 38 once the lever is moved beyond gear position 4. The additional creep gear speeds may be now utilized up until gear position 12, where the limiting notch 42 prevents further shifting into higher speeds with which the creep clutch is not used. Once the lever 12 is below position 4, the operator is able to disconnect the creep clutch if desired.

Tractors and similar earth-working implements are of course subjected to severe use and physical shocks. For example, shifting of the lever 12 against the arm 32 and particularly the limiting notch 42 could result in damage to the electrical switch 18 if the connecting linkage were rigid to transmit such shock. Thus, the flexible cable 50 is able to absorb shocks and prevent damage to the switch.

While the invention has been shown and described in connection with an implement having 18 direct drive gear speeds, it should be appreciated that the invention can apply with equal effectiveness to implements having a greater or lesser number of gears. Similarly, the number and span of gear positions in which the creep clutch is actuated (e.g., 4 through 12) may be varied by appropriate modifications in the dimensions of the portions of the arm 32.

It will be appreciated from the foregoing detailed description of the invention and illustrative embodiment thereof that numerous variations add modifications may be effected without departing from the true spirit and scope of the novel concept of the principles of the invention.

What is claimed is:

1. In combination with an implement transmission having a plurality of direct drive gears ranging from first gear to a fixed higher number, a gear shift lever manually operable by the implement operator for shifting to gear positions from said first gear to said higher number gear, and a creep clutch operationally associated with said direct drive gears, an apparatus for manually controlling the actuation of said creep clutch comprising:
   switching means manually operable between a creep clutch off position and a creep clutch on position; and
   limiting means cooperable with said gear shift lever for limiting the range of gear positions through which the lever can be shifted when the switching means is in said creep clutch on position.

2. Apparatus according to claim 1 wherein said limiting means comprises an elongated arm pivotable between a first position out of the path of movement of said gear shift lever and a second position lying in the path of movement of said gear shift lever, said gear shift lever preventing movement of said arm out of the first position when the lever is in a pre-determined low gear position above the first gear.

3. Apparatus according to claim 2 wherein said arm comprises a medial limiting notch, said limiting notch lying in the path of movement of said gear shift lever when the arm is in said second position and preventing movement of the lever beyond a second pre-determined gear position above said first pre-determined low gear position but below the fixed higher number gear position.

4. Apparatus according to claim 2, wherein said switching means is operable by said arm whereby the switching means is in the creep clutch off position when the arm is in the first position and the switching means is in the creep clutch on position when the arm is in the second position.

5. Apparatus according to claim 4 wherein said switching means comprises a flexible cable connected at one end to said arm and connected at the opposite end to an electrical switch, whereby physical shocks imparted to said arm are absorbed by said cable.

6. A creep control mechanism for a tractor or the like having a fixed number of direct drive gears ranging from first gear to a highest fixed number, a gear shift lever manually operable by the tractor operator for shifting to gear positions from said first gear to said highest fixed number, a control housing including a cover plate having an elongated slot defining a substantially straight line path of travel for said gear shift lever, and a creep clutch associated with said direct drive gears, said mechanism comprising:

an elongated arm pivotally mounted to said cover plate adjacent said slot; and switching means connected to said arm and operable to actuate said creep clutch, said arm being manually pivotable between a first position wherein the same is free of said slot and said switching means is in the creep clutch off position, and a second position wherein portions of the arm lie across said slot and said switching means is in the creep clutch on position, said arm, when in the second position, cooperating with said gear shift lever to limit the range of gear shift positions between the first gear and predetermined higher position below the highest gear.

7. A creep control mechanism according to claim 6 comprises opposed camming edges at the free end of said arm, said free end being positioned in substantial alignment with a pre-determined low gear position above the first gear whereby one of said camming edges prevents movement of said arm out of said first position when the gear shift lever is at or above said pre-determined low gear position.

8. A creep control mechanism according to claim 7 wherein said arm comprises a limiting notch lying across said slot when the arm is in said second position and adapted to limit movement of said gear shift lever to said pre-determined higher position, the other of said camming edges cooperating with the gear shift lever to prevent movement of said arm out of said second position when the gear shift lever is at or above said pre-determined low gear position.

9. A creep control mechanism according to claim 6 wherein said slot comprises a notch formed in the lateral edge thereof, and handle means on said arm projecting through said notch and grippable by the operator for pivoting said arm.

10. A creep control mechanism according to claim 8 wherein said highest fixed gear number comprises 18, said pre-determined low gear position comprises 4 and said pre-determined higher gear position is 12.

11. A creep control mechanism according to claim 6 wherein said switching means comprises a flexible cable connected at one end to said arm and at the opposite end to an electrical switch adapted to actuate said creep clutch.

* * * * *